Sept. 4, 1962 C. J. IMERSHEIN 3,052,360
FILTERING SEPTUM AND METHOD OF MAKING IT
Filed Oct. 18, 1957 2 Sheets-Sheet 1

INVENTOR.
CHARLES J. IMERSHEIN
BY Frederich Breitenfeld
ATTORNEY

Sept. 4, 1962  C. J. IMERSHEIN  3,052,360
FILTERING SEPTUM AND METHOD OF MAKING IT
Filed Oct. 18, 1957  2 Sheets-Sheet 2

INVENTOR.
CHARLES J. IMERSHEIN
BY
Frederick Breitenfeld
ATTORNEY

United States Patent Office 3,052,360
Patented Sept. 4, 1962

3,052,360
FILTERING SEPTUM AND METHOD OF MAKING IT
Charles J. Imershein, Valley Stream, N.Y., assignor to Multi-Metal Wire Cloth Co., Inc., New York, N.Y., a corporation of New York
Filed Oct. 18, 1957, Ser. No. 691,063
4 Claims. (Cl. 210—489)

This invention relates generally to filtration, and has particular reference to an improved filtering septum and a method of manufacturing it.

The filtering septum is of the type which employs the principle of edge filtration, and consists essentially of a pair of superposed sheets of metal each of which has in it a multiplicity of holes which are out of registry with those in the other sheet. More particularly, all the holes are of the same uniform diameter and arranged in the same spatial pattern, and the pattern is such that each hole faces an unperforated area in the adjacent sheet. Liquid to be filtered is thus constrained to squeeze edgewise through the minute space between the sheets.

It is a general object of the invention to provide a septum having enhanced rigidity and strength, a desirable high flow rate, high resistance to abrasion, and which is easy to sluice or clean off in other ways, and has no tendency to become clogged.

Another object is to provide an improved method of manufacture which makes it possible, at relatively low cost, to produce filtering devices of the kind mentioned in commercial quantities and of reliably uniform quality.

An edge-filtration septum, to be most effective for industrial filtration purposes, should have holes which are as small as possible and are arranged as close together as possible. This creates serious problems from a manufacturing standpoint, some of which have not heretofore been successfully solved. It is obviously essential, for example, that the holes in one of a pair of sheets should be accurately out of registry with those in the other, but the very creation of holes in a sheet of metal often produces unpredictable stretching of the sheet, and is subject to other dimensional deviations, so that the desired accurate non-registry of holes in a pair of superposed sheets, especially where each has thousands of holes in it, has often proved to be extremely difficult and commercially impractical. The present invention obviates this difficulty.

Another problem heretofore encountered stems from the fact that the uniformity of filtering ability of a septum of this kind depends so critically upon the maintenance of a uniform pressure between the two sheets. By the very nature of its edge-filtration principle of operation, the filtering ability of the septum is in proportion of the minute space between the sheets. It is therefore desirable to maintain this spacing at a uniform finite value, greater than zero, for if the plates are pressed together too firmly there will be no space at all, hence no filtering action. To achieve this result has heretofore presented manufacturing difficulties which this invention now serves to overcome.

A preferred way of accomplishing these general objectives, and such other objects and advantages as may hereinafter appear or be pointed out, is illustratively exemplified in the accompanying drawings, in which—

In practicing the invention, a pair of metal sheets 10 and 11 are first arranged in superposed contacting relation, and temporarily secured together. The sheets are preferably composed of light-gauge stainless steel having a thickness of approximately 0.008 inch, although other metals and alloys may be used, depending upon requirements. It has been found practical to start with sheets approximately eight feet long and 1½ feet wide. One way of temporarily securing the sheets together is by welding them along one end edge, as indicated at 12 in FIGURE 1.

Figure 1:
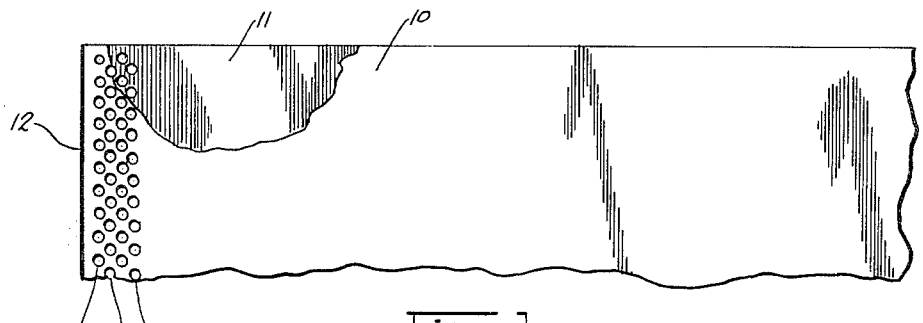
FIG. 1 is a fragmentary plan view of a pair of metal sheets during an initial stage of manufacture.

In this superposed relation, the pair of sheets is subjected, as a unit, to a punching procedure which forms a multiplicity of holes. In FIGURE 1 there is illustratively shown four rows 13 of such holes, each row being parallel to the end edge 12 and being diagonally offset with respect to the preceding row, thus forming a spatial pattern in which each group of four adjacent holes defines a square. The holes should be as small as it is possible to make them by a practical punching operation. For most purposes it is satisfactory to form the holes of a diameter of 0.045 inch, with the holes in each row spaced apart, center to center, by 0.09 inch. This produces an overall pattern in which there are approximately 118 holes per square inch.

A practical way of forming the holes is to advance the two-sheet unit stepwise to a punching instrumentality in which a plurality of punches are arranged in such a way that during each stroke two rows of holes are formed. This procedure is carried out for the full length of the unit. In a unit 8 feet long and 1½ feet wide, over 200,000 holes are thus produced. They are all of uniform diameter, and the pattern is such that there is adjacent to each hole an unperforated area or "land" larger than the hole.

Figure 2:
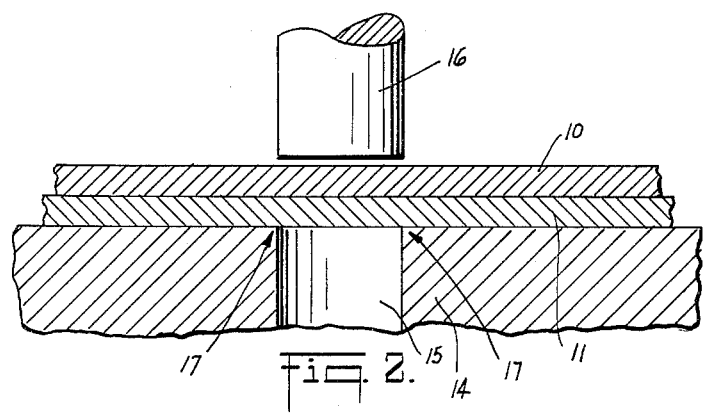
FIGURE 2 is a greatly enlarged fragmentary cross section showing how the sheets are subjected to a punching operation to produce the desired holes.
Figure 3:
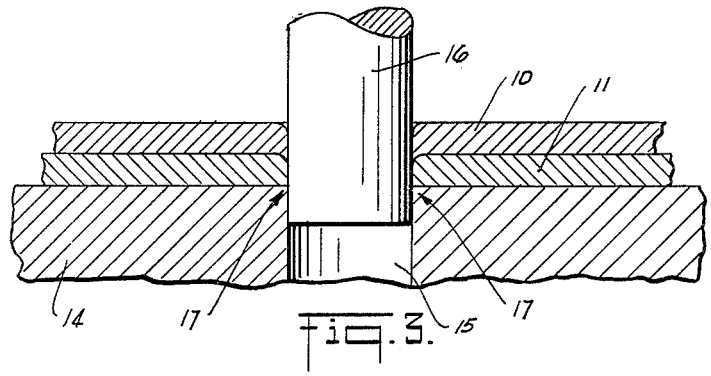
FIGURE 3 is a view similar to FIGURE 2, showing the parts at the completion of the punching stroke.

In FIGURES 2 and 3 there is illustrated, on a greatly enlarged scale, the manner in which each individual punch is caused to produce a burr on the inner face of one of the sheets, viz., on the inner face of the sheet 10 in the arrangement depicted in the drawings. In FIGURE 2 the sheets 10, 11 have been advanced to a punching station at which there is the hard bedplate 14 with a hole 15 therein, of the desired shape and size, and a complementary punch 16 arranged over the opening 15 and in accurate alignment therewith. The punch 16 is reciprocated (by any suitable motive power, not shown) under pressure sufficiently great to force it downwardly into the hole 15 through the interposed sheets. The lower edge of the punch comes into shearing relation to the upper edge 17 of the hole 15.

When the punch descends to the position of FIGURE 3, superposed disc-shaped areas (not shown) are torn out of the sheets 10, 11 and are pushed downwardly into the hole 15 from which they are then discharged. In accordance with this invention, the punch and bedplate are so chosen, as to hardness, and the sheets 10, 11 composed of sheet metal of such pre-selected thickness and ductility, that a distortion of the upper sheet 10 occurs during the punching procedure, as shown in FIGURE 3. The distortion occurs because the metal adjacent to the punch 16 "flows" downwardly to become partially embedded in the lower sheet 11. A similar distortion tends to take place in the sheet 11, but is prevented by the hardness and unyielding nature of the sharp edge 17 on the bedplate 14.

As a result of this, the sheets 10, 11 tend to cling together as the punching operations take place, row by row. Upon the conclusion of the punching operations, the welded edge 12 is cut off, and the two sheets are peeled from each other. This disconnects them and allows them to be shifted so as to bring the holes in one sheet completely out of registry with those in the other. This can be done with great accuracy, since any stretching produced by the punching operations will have occurred to an equal degree in each of the pair of sheets, and any other dimensional deviations arising from the step-by-step punching procedure will similarly have occurred in both sheets simultaneously.

The deformations that have taken place along the margin of each hole in the sheet 10, on its inner face, produce burrs, each of which bears against one of the unperforated areas in the sheet 11 after the sheets have been shifted to bring the holes out of registry. Each burr has a ragged edge, and thus bears against the unperforated area of the sheet 11 along a line of imperfect contact. This is indicated at 18 in FIGURES 5 and 6. This line of imperfect contact is pervious to a restricted flow of liquid, as will be readily understood.

Figure 4:
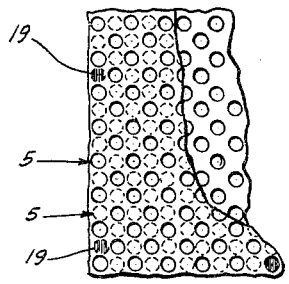
FIGURE 4 is a fragmentary plan view of the sheets of FIGURE 1 after they have been completely punched and then shifted to bring the holes out of registry.

The sheets in their shifted relationship are shown in FIGURE 4, in which there is also represented (at 19) the spot-welding by means of which the sheets are now permanently secured together. The spots 19 may be arranged at haphazard strategic intervals, and serve to hold the superposed sheets in firm permanent relationship. This produces the desired filtering septum, and the unit can be cut to any desired shape or size, depending upon the nature of the filter in which it is to be installed.

Figure 5:
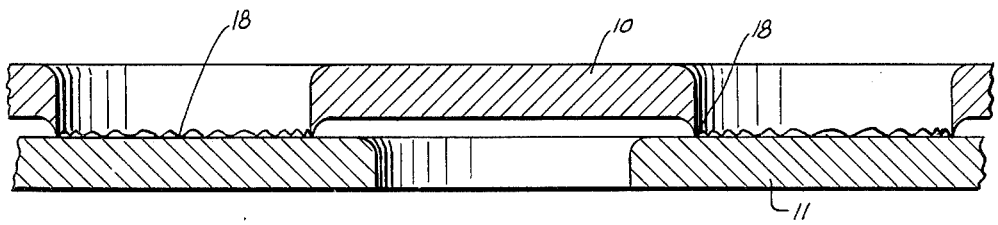
FIGURE 5 is a greatly enlarged cross sectional view taken substantially along the line 5—5 of FIGURE 4.
Figure 6:
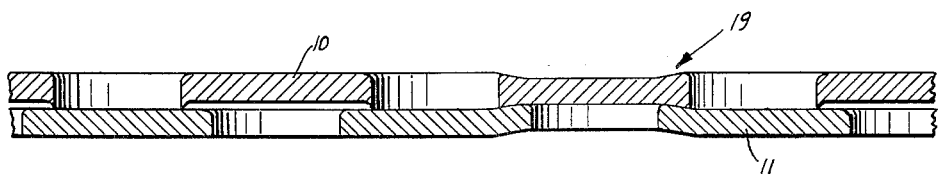
FIGURE 6 is a cross sectional view similar to FIGURE 5 but on a slightly reduced scale, showing one of the spot welds employed for holding the sheets in predetermined relationship.
Figure 7:
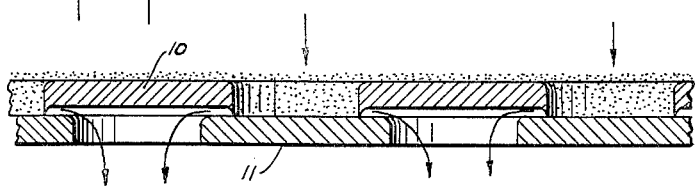
FIGURE 7 is a view similar to FIGURE 5 showing, diagrammatically, how the septum functions as a filtration medium.

The filtering septum is usually used for the filtration or other treatment of slurry with which a filter aid has been associated. It is common practice to pre-coat the filtering septum to a depth of approximately $\frac{1}{16}$ inch with the pure filter aid, which (as is well known in the art) may be composed of clay, diatomaceous earth, or the like. This coating is formed on the outer face of the sheet 10 (the upper face as depicted in FIGURES 5, 6 and 7), also along the sides of the holes in the sheet 10, and along the exposed portions of the inner face of the sheet 11 at the bottom of the holes. The restricted flow past the burrs 18 prevents the filter aid from passing through the septum. Then, when the slurry to be treated is directed through the septum in the direction of the arrows of FIGURE 6, it gradually builds up a cake, made up of filtered solids with or without additional filter aid, which is itself a filtering medium for the liquid which thereafter passes through it.

As is well known in the art, the filtering septum may be cleaned off at appropriate intervals. The present improved septum lends itself readily to such cleaning, and is resistant to all kinds of scraping devices. If desired, the cleaning may be accomplished by flushing or backwash, and the septum is easily cleaned by such procedures, and has no tendency to clog. Hence, it is easily maintained and has a long service life.

Among the advantages of the improved septum, in addition to the foregoing, are its high mechanical strength and its structural rigidity. Hence it requires little support in whatever filter or other mechanism it may be installed. Its surface is smooth, and resistant to corrosion as well as to abrasive cake materials. The septum has a high flow rate, in the general range of the denser filter cloths, and is often useful where textile or metallic filter cloths prove unsuitable. It can be used for all paper, chemical, and other industrial filtering and straining processes, and in all kinds of pressure- and vacuum-type mechanical filters, including vacuum filters of the rotary, horizontal rotary, and drum type.

While the septum is primarily intended for filtration and liquid clarification purposes, its unique construction and efficient uniformity and reliability of operation imbues it with a baffling or diffusing ability that makes it useful for other industrial fields. For example, it can be successfully employed in the porous bases of ion-exchange towers, in air distribution screens for mineral flotation equipment, in bubble trays, diffuser bottoms, mist dispellers, and other industrial fields. Accordingly, the terms "filtration" and "filtering" as used herein and in the appended claims, are intended to be broadly construed.

I claim:

1. A method of making a filtering septum, which consists in temporarily securing a pair of metal sheets in superposed contacting relation, subjecting the pair as a unit to a punching procedure which forms a multiplicity of holes therein, each hole being formed with a burr on the inner face of one of said sheets, said holes being of uniform diameter and arranged in a spatial pattern such that there is adjacent to each hole an unperforated area larger than said hole, then disconnecting said sheets and shifting them to bring the holes in one sheet completely out of registery with those in the other, whereby each burr bears against one of said unperforated areas along a line of imperfect contact pervious to a restricted flow of liquid, and permanently securing said sheets together in said shifted relationship.

2. A filtering septum comprising a pair of metal sheets in superposed contacting relation, each sheet having a multiplicity of holes therein and the holes in one of said sheets having marginal burrs on the inner face of said sheet, the holes in said sheets being of the same uniform diameter and arranged in the same spatial pattern, said pattern being such that there is adjacent to each hole an unperforated area larger than said hole, said sheets being secured together in a releationship in which the holes in one sheet are completely out of registery with those in the other, each burr bearing against one of said unperforated areas along a line of imperfect contact pervious to a restricted flow of liquid.

3. A method of making a filtering septum, which comprises the steps of temporarily securing a pair of metal sheets in facing contacting relation, subjecting the the facing contacting sheets as a unit to a punching operation which forms a multiplicity of holes therein with the punch initially entering through one of said sheets to form enlarged burrs on the inner surface of said one sheet, said holes being of uniform diameter and arranged in a spatial pattern such that there is adjacent to each hole an unperforated area larger than said hole, then disconnecting said sheets without deburring and shifting the sheets while maintaining their facing surfaces together to bring the holes in each sheet completely out of registery with those in the other sheet, whereby each enlarged burr bears against one of said unperforated areas along a line of imperfect contact pervious to a restricted flow of liquid, and permanently securing said sheets together in said shifted relationship.

4. A method of making filtering septums, which consists in superposing a pair of punchable elongated metal sheets, welding them together along one end edge, subjecting the pair as a unit to a progressive punching procedure which starts at the welded end and forms a multiplicity of transverse rows of closely spaced punched holes in said sheets, said holes being of uniform diameter and arranged in a spatial pattern such that there is adjacent to each hole, in a longitudinal direction, an unperforated area larger than said hole, disconnecting said sheets by severance of the welded edge, shifting one sheet relative to the other in a longitudinal direction to bring the holes in one sheet completely out of registry with those in the other, applying spot-welds at spaced intervals to resecure said sheets together in said shifted relationship, and finally severing the resultant two ply septum into individual units.

References Cited in the file of this patent

UNITED STATES PATENTS

| 2,436,108 | Heftler | Feb. 17, 1948 |
| 2,549,363 | Blickman | Apr. 17, 1951 |